(No Model.)
J. ROGERS.
WORK CENTERING APPARATUS.
No. 450,978. Patented Apr. 21, 1891.
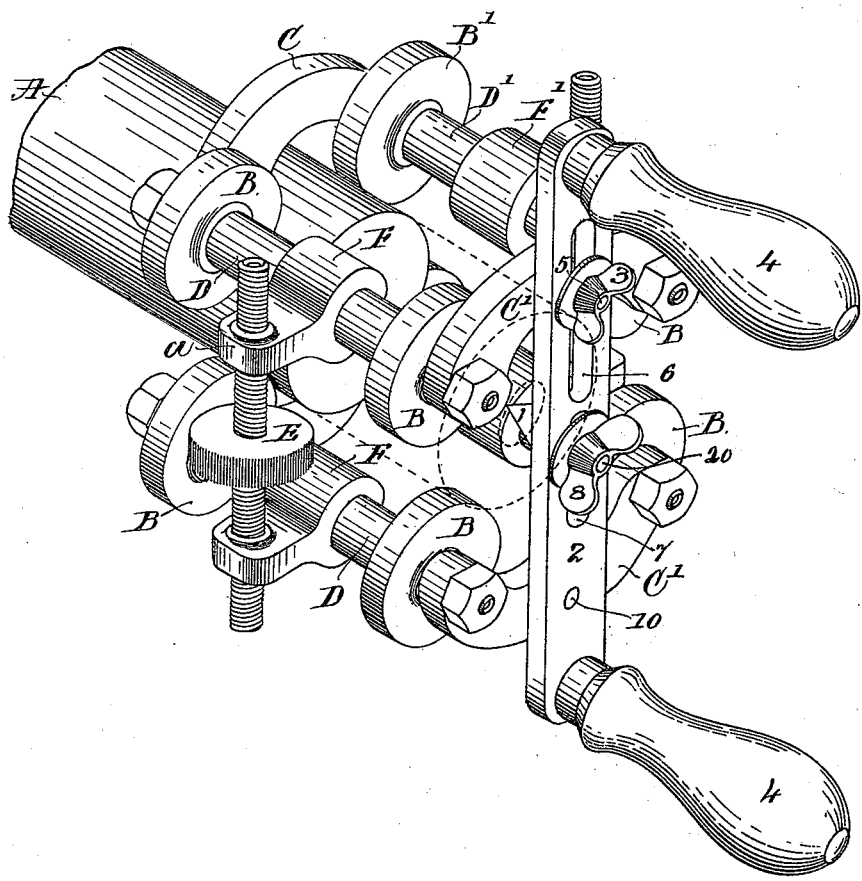
WITNESSES.
Edward F. Allen
John W. Daley
INVENTOR.
John Rogers,
by Lemby & Gregory
Attys.

UNITED STATES PATENT OFFICE.

JOHN ROGERS, OF NORTH ADAMS, MASSACHUSETTS, ASSIGNOR TO JAMES HUNTER & SON, OF SAME PLACE.

WORK-CENTERING APPARATUS.

SPECIFICATION forming part of Letters Patent No. 450,978, dated April 21, 1891.

Application filed November 28, 1890. Serial No. 372,846. (No model.)

*To all whom it may concern:*

Be it known that I, JOHN ROGERS, of North Adams, county of Berkshire, State of Massachusetts, have invented an Improvement in Work-Centering Apparatus, of which the following description, in connection with the accompanying drawings, is a specification, like letters and figures on the drawings representing like parts.

This invention relates to apparatus for centering and truing the center of pieces of work, and is especially adapted, among other things, to be used in finding the center and truing the center of shafts, spindles, gudgeon, and other cylindrical objects.

In accordance with my invention two work-engaging jaws are secured to a frame carrying a preferably adjustable centering tool or cutter, and the said work-engaging jaws are preferably connected together, as will be described, whereby they may be adjusted with relation to each other to engage work of different sizes.

My invention in a work centering and truing apparatus therefore consists in the combination, with work-engaging jaws and a supporting-frame for the same, of a centering or truing tool or device adjustably secured to the said supporting-frame, substantially as will be described.

Other features of my invention will be pointed out in the claims at the end of this specification.

The drawing represents a sufficient portion of a shaft engaged by my improved centering apparatus to enable my invention to be understood.

The piece of work to be centered, herein shown as a shaft A, is, in accordance with my invention, grasped between two work-engaging jaws preferably constructed, as will be described.

The work-engaging jaws, as shown, are each composed of links C C', connected by axles D D', upon which are mounted friction or bearing surfaces, preferably rollers B B', to engage the work, and hubs F F', having arms *a* provided with threaded openings, through which is extended a right-and-left threaded rod or screw E, by which the jaws may be adjusted with relation to each other to accommodate the jaws to work of different sizes.

The work-engaging jaws are secured, as will be described, to a cutter-carrying frame, herein shown as a bar 2, provided at its opposite ends, as herein shown, with handles 4.

The lower work-engaging jaw is herein shown as firmly secured to the bar 2 by pivoting the link C', as at 10, and the upper work-engaging jaw is adjustably secured to the bar 2 by means of a thumb-screw 3, engaging a threaded rod or projection 5 on the link C' of the said upper jaw, the said rod or projection being extended through a slot 6 in the upper portion of the bar 2. The bar 2 is provided near its center, as herein shown, with a slot 7, through which is extended a cutting or centering tool 1, adjustably secured to the bar 2 by a thumb-screw 8.

I have herein shown only the upper jaw *a* adjustably secured to the cutter-carrying bar 2; but, if desired, the lower jaw may also be adjustably secured thereto in a similar manner.

In operation the work-engaging jaws are first adjusted with relation to each other to fit or engage the work, which in the present instance is the shaft A. This adjustment is accomplished, as herein shown, by loosening the thumb-screw 3 and turning the threaded rods E. After the jaws have been adjusted and the bearing surfaces or rollers B B' brought in engagement with the shaft A or other work to be centered, the cutting-tool 1 is adjusted in its carrying-bar until a true center on the bar 2 has been reached, which is effected by loosening the thumb-screw 8 until the center stud 20 of the said thumb-screw is midway between the stud 5 and the pivot 10, after which the cutting-tool is made fast to its carrying-bar 2, as by the thumb-screw 8, and the said bar may then be turned by the handles 4 and the center cut or marked on the shaft; or, if the shaft has been previously centered, the tool 1 will true the center. If desired, the cutter-carrier 2 may be stationary and the shaft revolved.

I have herein shown the bearing or friction surfaces as rollers; but I do not desire to limit my invention to the particular bearing-surfaces shown.

I claim—

1. In a work centering and truing apparatus, the combination, with work-engaging jaws and a supporting-frame for the same, of a centering or truing tool or device adjustably secured to the said supporting-frame between said jaws, and means for adjusting it, substantially as described.

2. In a work centering and truing apparatus, the combination, with work-engaging jaws, one of which is adjustable upon the supporting-frame with relation to the other, and means for retaining said jaw in adjusted position, of a supporting-frame to which the said jaws are secured, and a centering or truing tool adjustable on said supporting-frame between the said work-engaging jaws, substantially as described.

3. In a work centering and truing apparatus, the combination, with work-engaging jaws, one of which is adjustable with relation to the other, of a cutter-carrying bar provided with handles and to which the said jaws are secured, and a centering or truing tool or cutter adjustably secured on the said bar, and means for moving it longitudinally on said bar and securing it in adjusted position, substantially as described.

4. In a work centering and truing apparatus, the combination, with two work-engaging jaws composed of links C C', axles D D', bearing-surfaces B B' on said axles, hubs F F', and threaded rods or screws connecting said jaws, of a cutter-carrying bar to which the said jaws are secured, one of the said jaws being adjustably secured to the said bar, and a centering tool or cutter adjustable on the said bar, substantially as described.

In testimony whereof I have signed my name to this specification in the presence of two subscribing witnesses.

JOHN ROGERS.

Witnesses:
JAMES D. HUNTER,
HERBERT E. WETHERBEE.